Aug. 8, 1950 W. T. MATHIS 2,517,796
LIQUID MEASURING DISPENSER
Filed Nov. 28, 1945 2 Sheets-Sheet 2
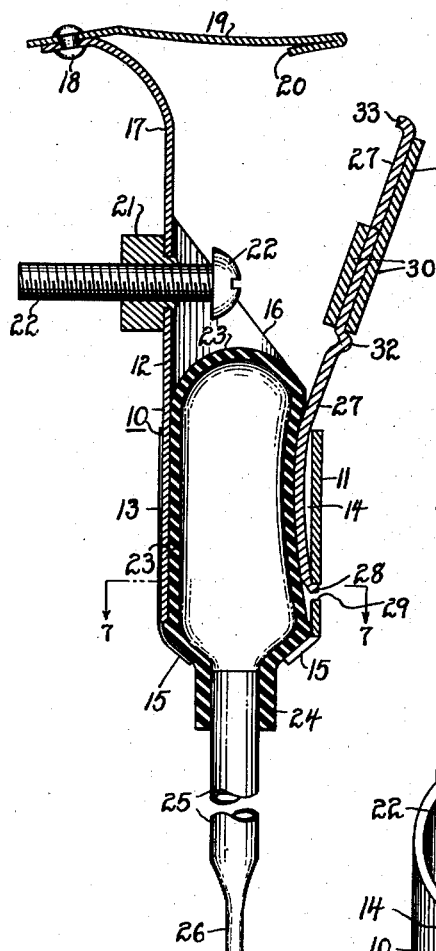
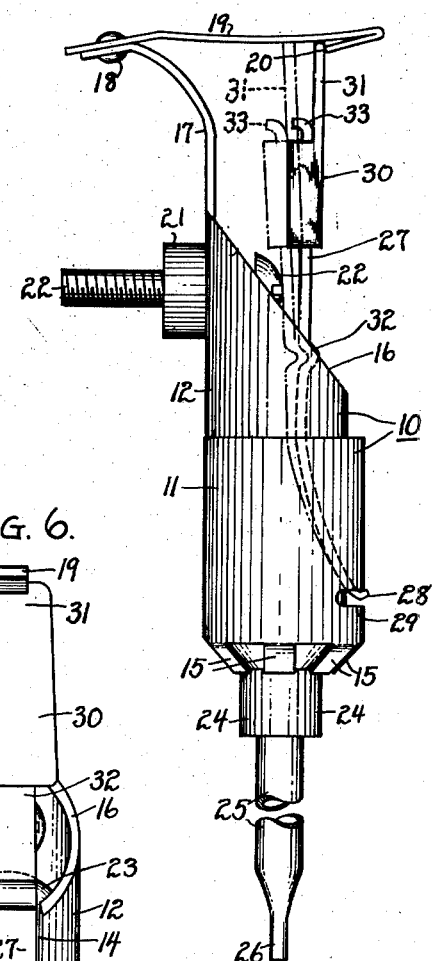
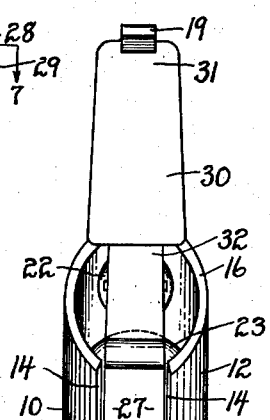
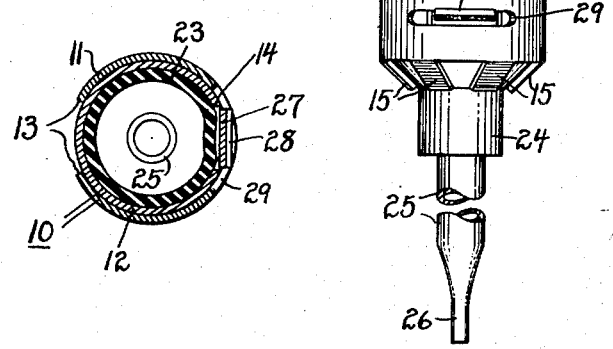
INVENTOR
WADDY T. MATHIS
By
Seymour, Carlin Nichols
ATTORNEYS Patented Aug. 8, 1950

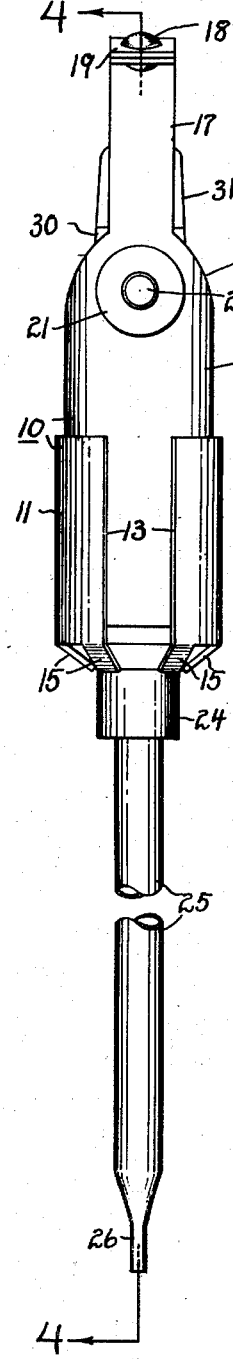
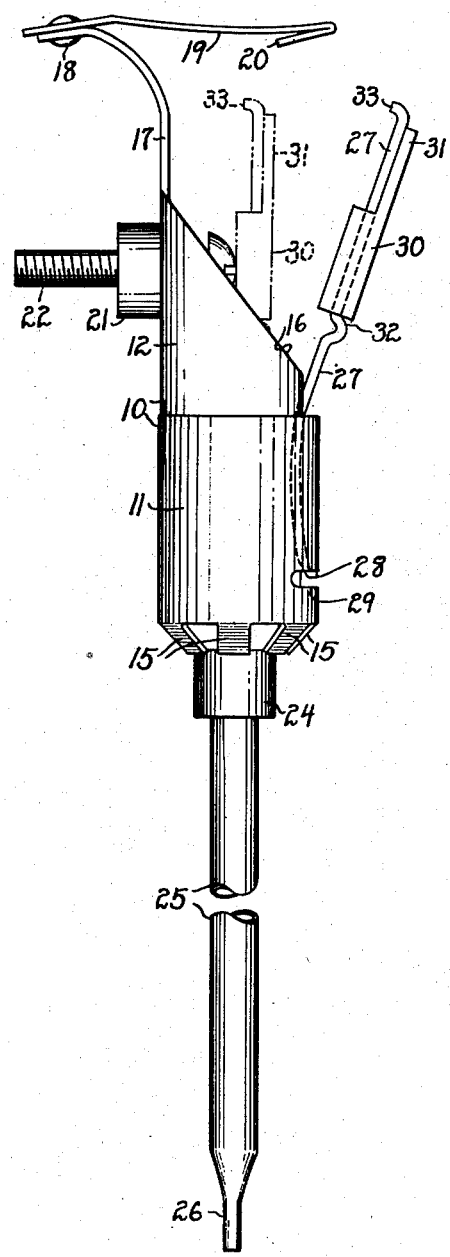
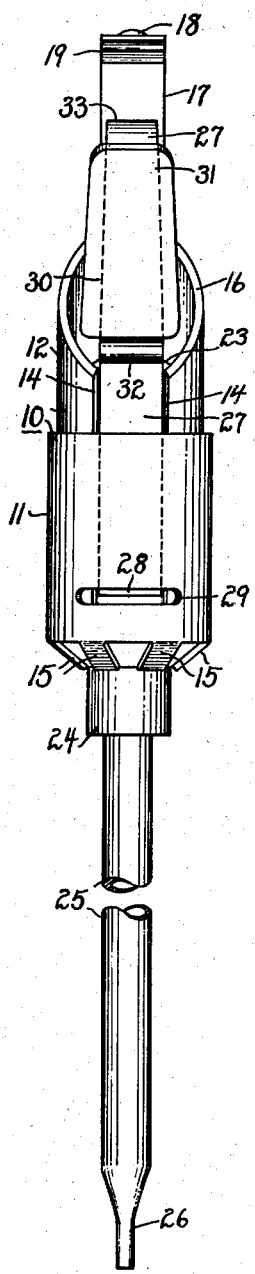

2,517,796

UNITED STATES PATENT OFFICE 2,517,796

LIQUID-MEASURING DISPENSER

Waddy T. Mathis, Hamden, Conn.

Application November 28, 1945, Serial No. 631,308

6 Claims. (Cl. 222—43)

The present invention relates to improvements in liquid dispensers and relates more particularly to dispensers which also serve to accurately measure liquid as the same is dispensed.

The liquid-measuring dispensers of the present invention are primarily designed for the use of chemists and other technicians in lieu of ordinary pipettes though available for other uses as will be apparent to those skilled in the art from the following.

One of the objects of the present invention is to provide a superior liquid-measuring dispenser which may be relied upon to accurately dispense a desired amount of liquid.

Another object of the present invention is to provide a superior dispenser of the character referred to whereby the device may be conveniently charged with a relatively-large volume of liquid and which will provide for the dispensing of such liquid in relatively-minute quantities.

A further object of the present invention is to provide a superior liquid-measuring dispenser which may be rapidly and conveniently adjusted as to the volume of liquid to be discharged.

Still another object of the present invention is to provide a superior dispenser of the character referred to and by means of which different volumes of liquids may be dispensed without requiring the resetting of the primary adjustments.

A still further object of the present invention is to provide a superior liquid-measuring dispenser which may be manipulated with great rapidity to effect the accurate discharge of measured amounts of liquids.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is an edge view of one form of liquid-measuring dispenser embodying the present invention;

Fig. 2 is a view thereof in side elevation;

Fig. 3 is an edge view of the liquid dispenser viewing the same from the opposite direction from the direction in which Fig. 1 is viewed;

Fig. 4 is a central-longitudinal sectional view taken on the line 4—4 of Fig. 1;

Fig. 5 is a view in side elevation similar to Fig. 2 but showing the slide shifted into position for coaction with the latch to effect the discharge of relatively-minute quantities of liquids;

Fig. 6 is an edge view of the showing of Fig. 5; and

Fig. 7 is a transverse sectional view taken on the line 7—7 of Fig. 4.

The particular liquid-measuring dispenser illustrated in the accompanying drawings for purposes of making clear one form of the present invention, includes a body generally designated by the reference character 10 and comprising an outer body-member 11 and an inner body-member 12 tightly fitting within the interior of the said outer body-member.

Both of the body-members 11 and 12 may be conveniently formed-up from sheet metal in such manner that the outer body-member 11 is formed with a vertical gap 13 and the inner body-member 12 is formed with a vertical gap 14 located diametrically-opposite the gap 13 in the outer body-member 11.

At its lower edge, the outer body-member 11 is provided with an annular series of inwardly-and-downwardly sloping retaining-fingers 15 which, in effect, provide an apertured bottom for the body 10.

The upper edge 16 of the inner body-member 12 is beveled or sloped and has projecting upwardly and outwardly from its uppermost point, an upwardly-and-outwardly curved arm 17. To the end of the arm 17 is secured in any suitable manner such, for instance, as by a rivet 18, one end of a resilient-latch 19. The said latch 19 may be conveniently formed of spring material such, for instance, as spring brass, and extends across the upper end of the body 10. At its free end the latch 19 is reversely bent to provide a latching-abutment 20 facing toward the arm 17.

Directly below the resilient-latch 19 and the arm 17, the inner body-member 12 has rigidly secured against its outer face an internally-threaded bushing 21 receiving a stop-screw 22.

Located within the body 10 is a bulb 23 formed of rubber or other suitable yielding material and provided with a depending tubular-extension 24 projecting downwardly through the central space provided by the inner edges of the annular series of retaining-fingers 15, as is especially well shown in Fig. 4.

Fitting into the interior of the extension 24 of the bulb 23, is the upper end of a tube 25 which may be formed of glass or other suitable chemical-resisting material. The said tube 25 is formed at its lower end with a contracted tubular terminal 26, through which latter fluid may be drawn into the tube or expelled therefrom in a manner as will hereinafter appear.

Normally accommodated in the gap 14 in the inner body-member 12 is the lower portion of a compressing-lever 27 which is adapted to engage the adjacent periphery of the bulb 23 to compress the same, in a manner as will hereinafter appear. At its extreme lower end, the lever 27 is bent outwardly to form a locating-finger 28 projecting into and fulcruming in an arcuate horizontal slot 29 formed in the periphery of the outer body-member 11.

The upper portion of the compressing-lever 27 extends upwardly beyond the upper edge of the outer body-member 11 and the beveled edge 16 of the inner body-member 12, and has mounted upon it with capacity for vertical reciprocation, a latching-slide 30 provided with an upwardly-extending latching-finger 31.

For purposes of limiting the reciprocating movement of the latching-slide 30 upon the upper portion of the compressing-lever 27, the said compressing-lever is formed with an offsetting limiting-rib 32 located adjacent its point of entry into the interior of the body-member 11, and is also formed with a limiting-finger 33 bent inwardly from the upper end of the compressing-lever.

The latching-slide 30 above described is constructed and arranged so that when in its lowermost position as indicated in Figs. 1, 2 and 4 inclusive, its inner face will engage with the head of the stop-screw 22 to thus limit the inward-swinging movement of the compressing-lever 27 to any desired amount, dependent upon the adjustment of the said stop-screw. When in its elevated position as indicated in Figs. 5 and 6, the latching-slide 30 is adapted to permit the inner face of the compressing-lever 27 to engage directly with the head of the stop-screw 22, and to bring its latching-finger 31 into a position wherein the outer face of its upper end will engage with the latching-abutment 20 of the resilient-latch 19.

*Operation*

The liquid-measuring dispenser of the present invention may be used in a wide variety of manners, but for purposes of making clear some of the advantages of the present invention, the following is to be considered.

Assuming that the chemist or other user desires to dispense relatively-large volumes of liquid, he may adjust the stop-screw 22 to a position wherein its head will be engaged by the inner face of the latching-slide 30 when the compressing-lever 27 has been swung inwardly, to effect the desired degree of compression of the bulb 23. The compression of the bulb 23 will serve to expel the desired amount of liquid from the tube 25. It is to be assumed in this connection, that the tube 25 had previously been charged with the desired liquid by first compressing the bulb 23 and then permitting it to expand to draw the liquid into the tube 25.

Let it be now assumed that the user wishes to dispense minute quantities of liquid. Under these conditions and while grasping the upper portion of the device in the hand, the user may, by means of his thumb, elevate the latching-slide 30 until the same is checked by the limiting-finger 33. This movement will project the latching-finger 31 beyond the upper end of the compressing-lever 27 and into position for engagement with the latching-abutment 20 of the resilient-latch 19, as is indicated in Figs. 5 and 6.

Assuming that the tube 25 has already been charged with a relatively-large amount of the desired liquid by compressing the bulb 23 before raising the latching-slide 30, the stroke of the compressing-lever 27 will now be limited to that permitted by the position of the stop-screw 22 with respect to the latching-abutment 20 of the latch 19, as is indicated in Fig. 5.

The compressing-lever 27 may now be swung back and forth between the limits above described and as indicated by the full and broken-line positions of the latching-slide 30 in Fig. 5.

With a relatively-large amount of liquid having been previously drawn up into the tube 25, each full cycle of swinging movement of the compressing-lever 27 within the limits indicated in Fig. 5 will cause the expulsion from the lower end 26 of the tube 25 of the desired minute quantity of liquid. The shifting of the latching-slide 30 back into its lowered position will restore the dispenser to its larger capacities.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A liquid-measuring dispenser, including in combination: a body; an expansible and compressible hollow bulb carried by the said body and having an opening through which liquid may move into and out of the interior of the hollow bulb; a compressing-member operatively associated with the said hollow member in position to compress the same and expel liquid through its said opening; stop-means constructed and arranged to limit the movement of the said compressing-member in the direction to compress the said hollow member; a first latching-member carried by the said body; and a second latching-member carried by and shiftable with respect to the said compressing-member into and out of position to cooperate with the said first latching-member to releasably limit the movement of the said compressing member in the opposite direction.

2. A liquid-measuring dispenser, including in combination: a body; an expansible and compressible hollow bulb carried by the said body and having an opening through which liquid may move into and out of the interior of the hollow bulb; a compressing-lever operatively associated with the said hollow member in position to compress the same and expel liquid through its said opening, the said compressing-lever being pivotally connected to the said body; stop-means constructed and arranged to limit the movement of the said compressing-lever in the direction to compress the said hollow member; a first latching-member carried by the said body; and a second latching-member carried by and shiftable with respect to the said compressing-lever into and out of position to cooperate with the said first latching-member to releasably limit the movement of the said compressing-lever in the opposite direction.

3. A liquid-measuring dispenser, including in combination: a body; an expansible and compressible hollow bulb carried by the said body and having an opening through which liquid may move into and out of the interior of the hollow bulb; a compressing-member operatively associated with the said hollow member in position to compress the same and expel liquid through its said opening; stop-means constructed and arranged to limit the movement of the said compressing-member in the direction to compress the said hollow member; a latching-member carried by the said body; and a latching-slide mounted for capacity for reciprocation upon the said compressing-member into and out of position for engagement with the said first latching-member to limit the movement of the said compressing-member in the opposite direction.

4. A liquid-measuring dispenser, including in combination: a body; an expansible and compressible hollow bulb carried by the said body and having an opening through which liquid may move into and out of the interior of the hollow bulb; a compressing-lever operatively associated with the said hollow member in position to compress the same and expel liquid through its said opening, the said compressing-lever being pivotally-connected to the said body; stop-means constructed and arranged to limit the movement of the said compressing-lever in the direction to compress the said hollow member; a latching-member carried by the said body; and a latching-slide mounted for capacity for reciprocation upon the said compressing-lever into and out of position for engagement with the said first latching-member to limit the movement of the said compressing-lever in the opposite direction.

5. A liquid-measuring dispenser, including in combination: a body; an expansible and compressible hollow bulb carried by the said body and having an opening through which liquid may move into and out of the interior of the hollow bulb; a compressing-member operatively associated with the said hollow member to compress the same and expel liquid through its said opening; stop-means constructed and arranged to limit the movement of the said compressing-member in the direction to compress the said hollow member; a flexible latching-arm carried by the said body; and a movable latching-member carried by the said compressing-member with capacity for movement with respect thereto into and out of position for engagement with the said flexible latching-arm to limit the movement of the compressing-member in the opposite direction.

6. A liquid-measuring dispenser, including in combination: a body; an expansible and compressible hollow bulb carried by the said body and having an opening through which liquid may move into and out of the interior of the hollow bulb; a compressing-lever operatively associated with the said hollow member to compress the same and expel liquid through its said opening, the said compressing-lever being pivotally-connected to the said body; stop-means constructed and arranged to limit the movement of the said compressing-lever in the direction to compress the said hollow member; a flexible latching-arm carried by the said body; and a movable latching-member carried by the said compressing-lever with capacity for movement with respect thereto into and out of position for engagement with the said flexible latching-arm to limit the movement of the compressing-lever in the opposite direction.

WADDY T. MATHIS.

REFERENCES CITED

The following references are of record in the file of this patent:

UNITED STATES PATENTS

| Number | Name | Date |
| --- | --- | --- |
| 1,332,392 | Fulton | Mar. 2, 1920 |
| 2,104,990 | Hoefler | Jan. 11, 1938 |

FOREIGN PATENTS

| Number | Country | Date |
| --- | --- | --- |
| 407,288 | France | Feb. 23, 1910 |
| 622,850 | France | Mar. 8, 1927 |